Oct. 31, 1961     E. F. MAYER     3,006,044

STRUCTURAL MATERIAL COMPOSITE PRODUCING APPARATUS

Filed Sept. 21, 1959

INVENTOR

EDWARD F. MAYER

BY Lawrence I Field

ATTORNEY

United States Patent Office 3,006,044
Patented Oct. 31, 1961

3,006,044
STRUCTURAL MATERIAL COMPOSITE
PRODUCING APPARATUS
Edward F. Mayer, Novelty, Ohio, assignor to Horizons Incorporated, Cleveland, Ohio, a corporation of New Jersey
Filed Sept. 21, 1959, Ser. No. 841,198
1 Claim. (Cl. 22—122)

This invention relates to a new material and to a process for producing same. More particularly it relates to a composite consisting of hollow spherical particles surrounded by a metal matrix and to the manner in which said composite is produced.

In many fields there is a need for materials with good mechanical strength and low thermoconductivity, and a number of materials have been devised to satisfy this need. Porous aggregates are commonly used to provide thermal insulation and other substances of a similar nature are known. Such prior materials have been characterized by a relatively low mechanical strength and hence have remained of limited applicability.

The present invention comprises a procedure and product in which hollow spherical particles are embedded in a metal binder to produce a product having good mechanical strength and which can be readily sawed or machined to desired dimensions.

Briefly in accordance with the invention, hollow spheres, preferably of a graded size, are charged into a mold or other vessel of determined volume and thereafter tapped or otherwise gently caused to settle. Thereafter a liquid metal at a temperature insufficient to substantially melt or otherwise destroy the character of the hollow spheres is introduced into the interstices between the spheres. The metal is permitted to solidify, preferably under pressure, and the resulting composite is removed from its confining means or mold after it has cooled.

Many combinations of materials may be employed in the practice of this invention; it merely being preferred that the metal be one which is relatively inert (chemically and physically) to the material of the hollow spherical particles.

One preferred hollow sphere, sold commercially as "Kanamite," comprises the hollow spheres produced in accordance with the teachings of U.S. Patent 2,676,892. With this material the preferred metals are those which melt at relatively low temperatures. By way of example, lead, zinc, tin, copper, aluminum, die-cast alloys and ZnSb have all been successfully employed in the process. With higher melting metals such as for example iron or stainless steel, I prefer to use a sphere of higher melting material such as alumina.

The relative proportions of spheres to metal are not critical and may vary between 40%:60% by volume to 60%:40% by volume, depending in some measure on the particle sizes of the hollow spheres. The following examples are intended to illustrate this invention and are not to be construed as limitative.

Figure 1:
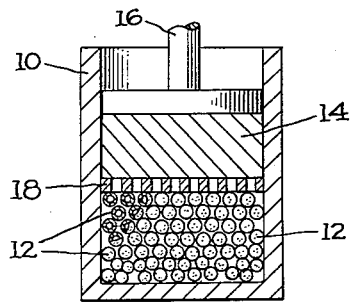
Figure 2:
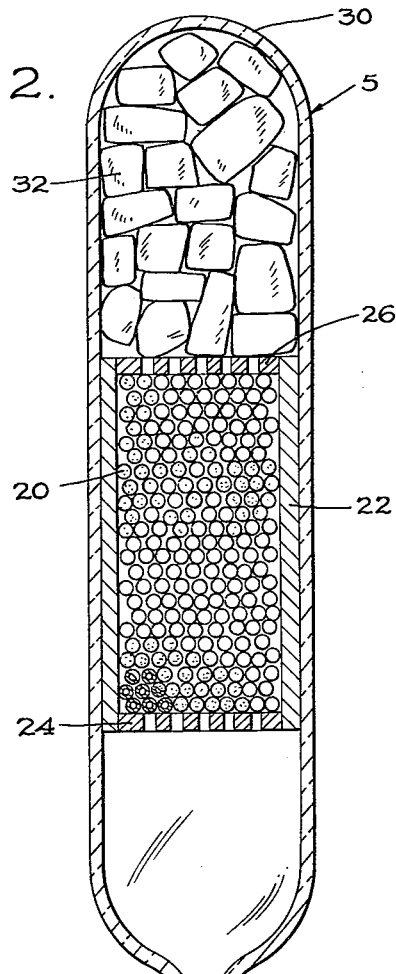
Figure 3:
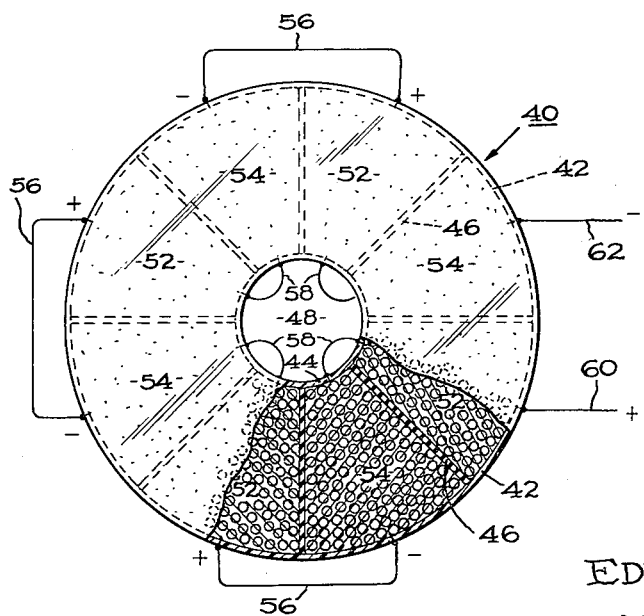

In the drawings FIGURE 1 illustrates diagrammatically one form of apparatus suitable for carrying out the present invention and FIGURE 2 illustrates a preferred modification of such apparatus. FIGURE 3 is a schematic view of a thermoelectric generator utilizing the product of the present invention.

EXAMPLE 1

Using the apparatus of FIGURE 1, a hollow mold 10 about ½" in diameter by 4" long was filled with expanded hollow clay spheres 12 (−150, +325 mesh, Tyler Standard) of the type described in Patent 2,676,892. After filling, the mold was tapped gently to pack the spheres into the mold. The upper section of the mold was filled with the metal 14 to be infiltrated around the spheres and the entire assembly heated in a furnace until the metal 14 melted. Either a single slug of metal, or fragments of metal may be used. Pressure was applied to a plunger 16 fitting in the mold, thereby forcing the molten metal through the openings of a grid 18 and into the interstices surrounding the hollow spheres. The metal employed in this experiment was a zinc die-cast material composed of an alloy having a nominal composition of about 95% Zn, 4% Al, and 1% Cu (specific gravity 6.7). After casting, the density was reduced about 60% as compared with the density of the original die-cast alloy, to 2.7 grams per cubic centimeter and the modulus of rupture was 10,000 p.s.i.

EXAMPLE 2

The procedure was similar to Example 1 except that aluminum metal was employed. Again the density of the aluminum product was reduced about 60% as compared with solid Al, i.e. to 1.2 and the modulus of rupture was determined to be 6,000 p.s.i.

EXAMPLE 3

The above procedure was repeated but with zinc antimonide as the matrix surrounding the hollow spheres. Again reductions in density were of the order of 60% as compared with the density of the solid zinc antimonide to about 2.8. As compared with solid zinc antimonide, the thermal conductivity was reduced by a factor of 3 from 0.0247 watt cm./°C. to 0.0082 watt cm./°C., while the resistivity increased a similar amount from 0.0023 ohm cm. to 0.0065 ohm cm. This is advantageous in certain thermoelectric designs. To use the material in a thermoelectric generator it is, of course, provided with the usual electrical connections and desired configuration, e.g. by sawing, machining, etc. in the same manner as conventional materials are presently fabricated.

For uniformity and completeness of impregnation the following technique, employing the apparatus shown in FIGURE 2, has been found to be particularly satisfactory: Hollow spheres 20 are charged into a collapsible envelope 30 along with a measured excess of metallic impregnant 32. Thereafter the envelope is sealed except for one or more valved connections through which the envelope is then evacuated. Once it has been evacuated the envelope and its contents are heated by any suitable means to a temperature sufficient to melt the metal and thereafter to an even higher temperature to soften the envelope itself. Continued application of the vacuum, for example by an actively pumping system, causes the envelope to collapse and exert a pressure on the molten impregnant and on the other contents of the envelope sufficient to insure a thorough and complete infiltration of the particles. This manner of operation is illustrated in the following example and constitutes a preferred embodiment of my invention.

EXAMPLE 4

Using the apparatus of FIGURE 2, round ingots of two phase materials were cast by the following procedure: First, hollow spheres were inserted and packed into a mold 22 fitted with two plugs 24 and 26, each provided with holes large enough to permit the molten metal to pass through the plugs but sufficiently small to confine the hollow (Kanamite) spheres. A long glass tube 30 closed at one end and large enough to slidingly receive the mold 22 was prepared. An amount of zinc die-cast 32 slightly more than enough to fill the mold is charged as small pieces and the mold was inserted in the tube. By suitable connection the envelope 30 was connected to a vacuum pump. Since the Kanamite has a tendency to outgas upon heating, pumping was not started immediately but only after the temperature of the assembly was 50 to 75° C. below the softening point of the glass envelope 30. The entire assembly was next placed in a furnace and heated slowly to 50° C. to 75° C. below the softening point of the glass. At this time the vacuum pump was started and the interior of the glass envelope evacuated. It has been found satisfactory to either seal off the evacuated envelope or continue pumping through the remainder of the operation. The assembly was heated further until the glass softens and collapses forcing the now molten metal into the mold filling the volume around the spheres. The assembly was permitted to cool and the resulting metal, sphere-containing slug was removed from the mold.

Similar products were prepared using various combinations of metals with hollow bodies to form structural materials characterized by excellent physical and mechanical properties and which were easily fabricated by conventional techniques. Hence these products are not to be considered equivalent in any respect to composites heretofore produced by filling plastic materials with hollow bodies to reduce the weight of the resulting composite.

In the table below there are listed by way of example some typical properties of materials produced in accordance with the present invention.

*Table I*

PROPERTIES

| Kanamite Sphere Parts by Volume | Metal and Parts by Volume | | Density | Modulus of Rupture, p.s.i. |
|---|---|---|---|---|
| 60 | Zinc-Aluminum Diecast | 40 | 2.7 | 12,000 |
| 60 | Aluminum | 40 | 1.2 | 6,000 |
| 60 | Lead | 40 | 8.0 | 2,500 |

In FIGURE 3 there is shown schematically, one manner in which the product of the process of Example 3 could be employed in a thermoelectric generator. The thermoelectric generator depicted consists of a shell 40 having an outer skin 42 and an inner skin 44 between which electrically insulating spacers 46 were secured. A hollow central bore 48 defined by the inner skin 44, is provided to receive a heat source (not shown). Each of the compartments defined by the spacers is adapted to snugly receive a block of material produced in accordance with the process of Example 3, after it has been shaped, e.g. by sawing, to the desired wedge shaped configuration shown.

Alternate segments are composed of positive thermoelectric material 52 and negative thermoelectric material 54 and the several segments are connected in series by leads 56 and 58 extending through the outer skin 42 and the inner skin 44 of the shell 40.

The electrical output is taken off by leads 60 and 62 electrically connected to a positive segment and a negative segment respectively.

One suitable material for the segment 52 of negative thermoelectric material ("n"-type semiconductor) would be hollow spheres of clay embedded in $Bi_2Te_3$, while for the segment 54 a suitable material of positive thermoelectric material ("p"-type semiconductor) would be hollow spheres of clay embedded in ZnSb.

I claim:

An apparatus for producing a composite structural material consisting of hollow inorganic spheres embedded in a metal matrix and possessing good mechanical strength and low thermoconductivity and which is capable of fabrication to desired dimensions by sawing and machining, which apparatus includes: a collapsible envelope made of a heat softenable material; mold means to confine a charge of hollow inorganic spheres in a first region of said envelope, said means consisting of at least one foraminous plug constituting a wall portion of said mold; means to confine a charge consisting of solid pieces of metal in a second region of said collapsible envelope, adjacent to and in direct communication with said first region through said foraminous plug; means to connect said envelope to a means to evacuate the atmosphere in said envelope; heating means to melt said metal and to soften that portion of the envelope surrounding and confining said metal; means to maintain a vacuum in said envelope, said heating means and said means to maintain a vacuum jointly constituting a means whereby the softened portion of the envelope collapses and forces the charge of metal, after it has been melted, into the voids between the hollow spheres, thereby forming on solidification of the metal, the desired low-weight, high-strength structural material.

References Cited in the file of this patent

UNITED STATES PATENTS

| 1,514,151 | Gerdien | Nov. 4, 1924 |
| 2,140,063 | Talalay | Dec. 13, 1938 |
| 2,189,340 | Donal | Feb. 6, 1940 |
| 2,194,036 | Talalay | Mar. 19, 1940 |
| 2,379,401 | Poulter | June 26, 1945 |
| 2,872,715 | Bean | Feb. 10, 1959 |
| 2,877,283 | Justi | Mar. 10, 1959 |
| 2,886,867 | Peterson et al. | May 19, 1959 |
| 2,902,528 | Rosi | Sept. 1, 1959 |
| 2,909,818 | Bungay | Oct. 27, 1959 |